May 9, 1950 D. D. AREHART 2,507,189
TRAILER HITCH
Filed Oct. 10, 1947 2 Sheets-Sheet 1
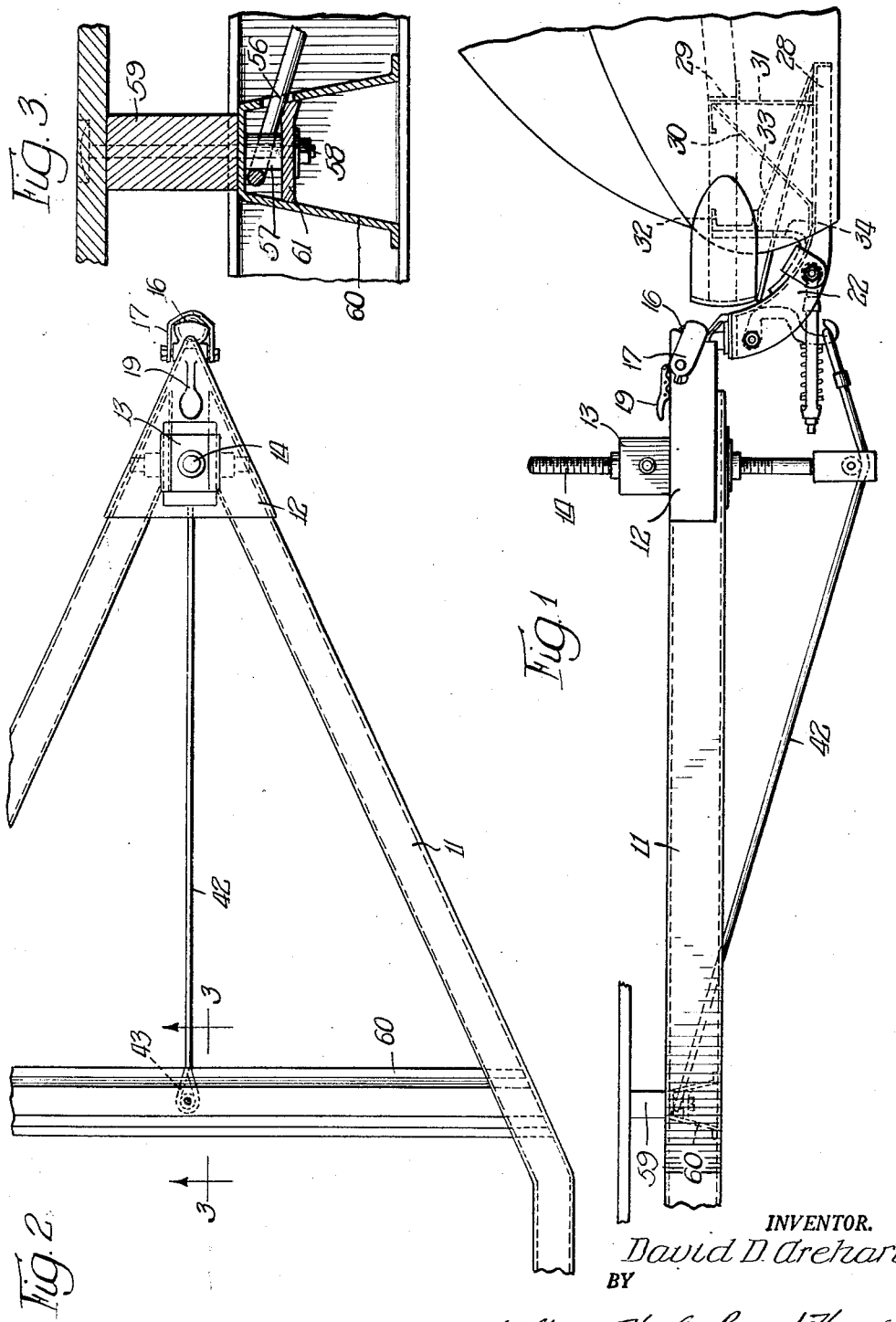
INVENTOR.
David D. Arehart,
BY
Wilkinson, Huxley, Byron & Hume
ATTYS.

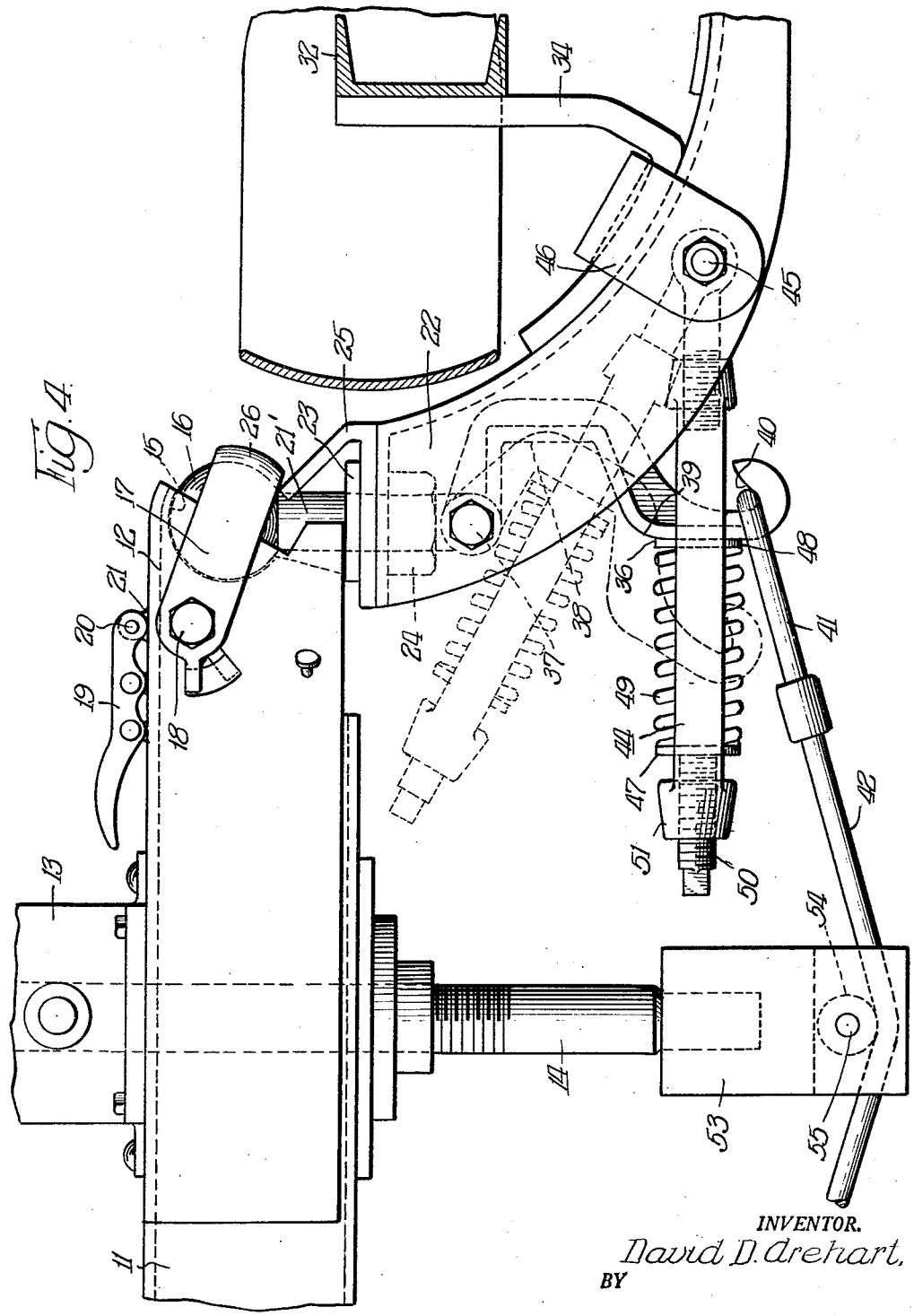

Patented May 9, 1950

2,507,189

UNITED STATES PATENT OFFICE 2,507,189

TRAILER HITCH

David D. Arehart, Flint, Mich., assignor to Palace Corporation, Flint, Mich., a corporation of Michigan Application October 10, 1947, Serial No. 779,015

7 Claims. (Cl. 280—33.9)

This invention relates to a new and improved trailer hitch, and more particularly to a hitch which selectively distributes the trailer load on the front and rear wheels of a towing vehicle and on the trailer wheels.

This present invention is in the nature of a modification and improvement on the Trailer hitch shown in my application, Serial No. 649,534, filed February 23, 1946.

While the present hitch is of wide application and may be used to connect trailers of various types to commercial types of tractors, it is particularly useful in connecting two wheeled trailers to usual types of passenger cars. The term two wheeled trailers is intended to include trailers having dual or tandem wheels, but in which the load is unbalanced so that a portion of the load is normally carried by the towing vehicle. The hitch may be used with smaller cargo trailers or the like, but is of greatest utility in connection with house trailers or other relatively heavy trailers which impose a substantial vertical load on the rear wheels and springs of the towing vehicle when connected by means of usual types of trailer hitches.

The usual types of trailer hitches provide various means for pivotally connecting the forward end or extension of a trailer frame to a fitting secured to the rear bumper and rear portion of the chassis frame of the towing vehicle. The trailer is normally provided with wheels well to the rear of its center of mass so as to render the trailer safe against tipping rearwardly under all conditions of use. In a typical construction, the trailer wheels are placed with approximately two-thirds of the trailer located forwardly of the trailer wheels. Thus when this unbalanced load is applied to the rear of a motor car, it depresses the rear springs and lowers the rear of the car. This action has a tendency to unbalance the weight of the car itself and cause more of that weight to be transmitted to the rear axle. The trailer load is applied to the cantilever overhang in the rear of the rear axle and has a tendency to lift the front axle. This may cause loss of traction with the front wheels sufficient to render steering with these wheels inefficient, especially under slippery road conditions.

Attempts are made to correct these unbalanced conditions by adding extra stiff leaves in the rear springs of the towing vehicle. Such attempts are expensive and render the vehicle less satisfactory in use when not towing the trailer. They are also only slightly effective in correcting the real difficulties, as the load remains unbalanced with the rear axle and tires heavily overloaded.

It is an object of the present invention to provide a trailer hitch of the load distributing type by which the trailer is readily attached and easily disconnected from the towing vehicle.

It is a further object to provide a hitch of this character in which a resilient connection for a tension member is provided on the towing vehicle.

It is an additional object to provide a construction including a swinging hook connection on the vehicle for attaching the tension member.

It is a further object to provide a hitch which is simple in design and construction and designed for commercial production and use.

Other and further objects will appear as the description proceeds.

I have shown certain preferred embodiments of my invention in the accompanying drawings, in which:

Figure 1 is a side elevation of the hitch showing portions of the vehicle and trailer;

Figure 2 is a plan view of the trailer portion of the hitch;

Figure 3 is an enlarged detail view taken on line 3—3 of Figure 2; and

Figure 4 is a view of the main portions of the hitch on an enlarged scale.

Referring first to Figure 1, the trailer is shown as provided with a frame 11, the forward portions of which incline inwardly and meet in a point which is covered by plate 12. This plate 12 carries a jack 13 which raises and lowers the threaded jack rod or shaft 14. The forward portion of the plate 12, as shown in detail in Figure 4, is provided with a socket 15 which fits against the rear and upper surfaces of a ball 16. The trailer also carries a stirrup 17 pivoted at 18 and adapted to be swung down over the forward portion of the ball 16, as shown in Figures 1 and 4. This stirrup 17 is retained in place by a latch mechanism actuated by the latch arm 19, this latch mechanism being retained in locked position by means of a pin 20 passing through a lug 21 carried by plate 12. The details of this locking mechanism form no part of the present invention and they will not be further described.

The ball 16 is supported on a shaft 21' which is secured in place on the bracket 22 by shoulder 23 and nut 24. The thrust bracket 25 fits on the upper face of bracket 22 and has an inclined portion 26 engaging the shaft 21 adjacent the lower ball surface to brace the ball against forward thrust. The bracket 22, as best shown in Figure 1, extends forwardly under the towing vehicle at 28 and is secured to a cross frame member 29 by braces 30 and 31. This bracket is secured to a rear frame member 32 by diagonal brace 33 and vertical brace 34. It will be seen, therefore, that the bracket is thoroughly and rigidly connected to the vehicle frame by a truss structure resistant to deformation by thrust in any direction.

The hook 36 is pivotally supported at 37 to the lower end of the shaft 21'. The hook is provided with a forwardly extended rear face portion 38 and with a rearward face portion 39, the latter being located substantially vertically below the ball 16 when in normal position, as shown in Figure 4. The lower end of the hook 36 is provided with a hooked portion 40 to receive the eye 41 on the forward end of the tension member 42.

The yoke 44 is pivoted at 45 on a pin carried by strap 46 which is secured to bracket 22 and the connecting member 34. The yoke 44 carries two sliding guide plates 47 and 48, between which is carried a compression coil spring 49. These plates 47 and 48 have notched sides to guide them in their travel on the sides of the yoke 44. The compression of spring 49 is adjusted by the threaded member 50 which is threaded onto the rear end portion 51 of yoke 44.

The jack shaft 14 carries a guide member 53 which is removably fitted on its lower end. The lower end of this member 53 is slotted and carries the roller 54 on pivot 55, the roller engaging an intermediate portion of the tension member 42.

As shown in Figures 1, 2 and 3, the rear end of the tension member 42 is provided with an eye 56 fitting about a sleeve 57 carried on bolt 58, which bolt passes up through a floor frame member 59 of the trailer and extends down through the trailer frame cross brace member 60. This member 60 has its ends secured to the side frame member 11 of the trailer frame. The bolt 58 also passes through a brace plate 61 fitted into the cross frame member 60.

In the use of the hitch, the vehicle is moved into position adjacent the forward end of the trailer frame so that the socket 15 comes against the rear and upper faces of the ball 16. It will be understood that the stirrup 17, at this time, is in the raised position. When the ball is seated in the socket, the stirrup is lowered and locked in place by handle 19 and pin 20. The jack rod 14 is, at this time, normally in a lower position supporting the forward end of the trailer.

The yoke 44 is swung upwardly to the position indicated in broken lines which permits the hook 36 to swing rearwardly, as shown in broken lines in Figure 4. The eye 41 of tension member 42 is then fitted over the hooked portion 40, after which the hook is swung forward and the yoke brought into full line position. The jack is now raised, the member 53 is now placed in position on the lower end of the jack shaft 14 and the jack is operated to lower the shaft 14 and apply tension to member 42. Tension is applied to the extent necessary to properly raise the rear of the vehicle and the forward portion of the trailer, and thus distribute the load on the vehicle axles in the desired manner.

To disconnect the trailer from the vehicle, the steps outlined are reversed. The first step comprises raising the jack shaft 14 to relieve tension on member 42, after which the yoke 44 is swung upwardly and the hook 36 swung rearwardly to facilitate moving the eye 41 in member 42 from the hook portion 40. The lock pin 20 is removed and handle 19 is operated to raise the stirrup 17, after which the trailer is free from the vehicle. Before being freed from the vehicle, the jack may be lowered against the ground to lift the socket from the ball and support the forward end of the trailer. The tension member 42 may be formed of a cable or of any other material having adequate strength and flexibility for the purpose.

In the form of construction shown, the upper members of the truss comprising the trailer frame 11, plate 12 and socket 15 are in compression, the vertical member consisting of the jack shaft 14 is in compression and the flexible member 42 is in tension. The ball shaft 21 and hook 36 form a continuation of the tension member. The ball 16 is held firmly in socket 15 by the pull of the tension member 42, but the ball is permitted a limited vertical and horizontal rotation in the socket. It will be apparent that increased tension on the member 42 not only compresses spring 49 but, when that spring has been compressed, serves to rotate hook 36 and shaft 21' about the center of ball 16 in the clockwise direction, as seen in Figure 4. In actual operation, there is substantial rotation in this direction.

In the use of the form of construction shown, the jack is lowered to support the forward end of the trailer at a suitable height above the ground so that the socket 15 in member 12 will clear the top of the ball 16 with the vehicle in normal position. The tension member 42 is not in use at this time. The vehicle and trailer are maneuvered to bring the socket above the ball 16, and the jack is lowered so that the socket seats on the ball and the weight of the forward portion of the trailer is taken up by the vehicle. This will cause the rear of the vehicle to sag substantially. The jack 14 is then raised and cable 42 has its eye 41 placed on hook 40. The jack is then forced downwardly until the roller 54 bears on tension member 42. At this time, the trailer and vehicle will still be in the lower position with the weight of the trailer applied to the rear springs and wheels of the vehicle. The jack shaft 14 is then forced downwardly against the cable 42, which has the effect of pulling rearwardly on the hook 36 and rotating the shaft 21 and hook 36 in a clockwise direction. This movement serves to lift the forward end of the trailer and the rear end of the car, although no parts of the hitch are touching the ground. The jack may be adjusted to raise the front of the trailer and rear of the vehicle the desired amount for proper distribution of the trailer load on the front and rear axles of the vehicle and on the trailer wheels.

The action which takes place is due to the fact that the lever formed by the distance between the ball 16 and hook end 40 is substantially at right angles to the chassis frame of the car and is rigidly connected thereto. Thus when the vertical lever turns in a clockwise direction, the chassis frame turns in the same direction. It actually moves about the rear axle as a pivot so that the rear of the car comes up and the front goes down because of the spring suspension of the vehicle wheels. If the wheels were rigidly connected to the frame, the rear wheels could be lifted clear of the ground by actuating the jack to apply tension to the members, and if sufficient range of adjustment were provided, that result could be had with spring-suspended wheels.

Such action is not desired in practice, but it is the purpose of the construction to distribute the load properly between the front and rear axles of the vehicle while maintaining an adequate portion of the load on the rear wheels for effective traction.

It is preferable that the connecting hook for the tension member be located substantially vertically below the ball connection, so that lateral swinging of the trailer relative to the vehicle does not either tighten or loosen the tension. While the vertical distance between the ball joint and tension member connection may be any reasonable distance, it has been found in practice that nine or ten inches provides adequate stiffness and leverage for usual types of house trailers attached to a standard automobile.

The discussion of the operation has been directed to the condition where the trailer wheels and the two sets of vehicle wheels are on a continuous straight support, whether level or inclined. It will be apparent that conditions will be changed when the car and trailer pass over a sharp crest or over a pronounced depression. In passing over a crest, the tension member will slack up somewhat but the tension will be taken up as soon as all wheels are again on a continuous straight surface. The spring 49 and swinging hook 36 are provided to take care of the situation when the car and trailer pass over a sharp depression. If there were no yielding in the tension member, a condition might arise in which the combination was supported entirely on the front vehicle wheels and the trailer wheels. Normal differences in the height of the support of the various wheels are largely taken care of by the spring suspensions of the several wheels. The resilience of the coil spring is important in taking care of sharp differences in elevation and in minimizing the difficulties of as long a combined wheel base as the distance between the front vehicle axle and the trailer wheels. The spring 49 also serves to take up slack or decreased tension in member 42 when the vehicle and trailer pass over a sharp crest.

While I have shown certain preferred embodiments of my invention, these are to be understood as illustrative only, as it is capable of variation and changes to meet differing conditions and requirements, and I contemplate such modifications as come within the spirit and scope of the appended claims.

I claim:

1. In a trailer hitch for connecting a vehicle and a trailer comprising a pivoted connection between rigid members of the vehicle and trailer, a tension member connecting the vehicle and trailer, said tension member extending below the pivotally connected rigid members, one end of said tension member being positively connected to a rigid portion of the trailer, resiliently yielding means carried by the vehicle, the other end of the tension member being connected to the yielding means, and means for applying tension to the tension member.

2. In a trailer hitch for connecting a vehicle and a trailer comprising a pivoted connection between rigid members of the vehicle and trailer, a tension member connecting the vehicle and trailer, said tension member being located below the pivotally connected rigid members, one end of said tension member being connected to a rigid portion of the trailer, resiliently yielding means carried by the vehicle, the other end of the tension member being connected to the yielding means, and means for applying tension to the tension member, said last named means comprising an adjustable compression member carried by the trailer and engaging an intermediate portion of the tension member.

3. In a trailer hitch for connecting a vehicle and a trailer comprising a pivoted connection between rigid members of the vehicle and trailer, a tension member connecting the vehicle and trailer, said tension member being located below the pivotally connected rigid members, one end of said tension member being connected to a rigid portion of the trailer, resiliently yielding means carried by the vehicle, said means comprising a hook member pivoted to the vehicle to swing in a vertical plane along the axis of the vehicle, resilient means connected to the vehicle adapted to resist rearward swinging of the hook member, the other end of the tension member being detachably connected to the hook member, and means for applying tension to the tension member.

4. In a trailer hitch for connecting a vehicle and a trailer comprising a pivoted connection between rigid members of the vehicle and trailer, a tension member connecting the vehicle and trailer, said tension member being located below the pivotally connected rigid members, one end of said tension member being connected to a rigid portion of the trailer, resiliently yielding means carried by the vehicle, said means comprising a hook member pivoted to the vehicle to swing in a vertical plane along the axis of the vehicle, resilient means connected to the vehicle adapted to resist rearward swinging of the hook member, the resilient means comprising a yoke pivoted to the vehicle, the yoke carrying a compressing spring acting against the rear face of the hook member, the other end of the tension member being detachably connected to the hook member, and means for applying tension to the tension member.

5. A trailer hitch for connecting a vehicle and a trailer comprising a ball rigidly connected to the vehicle, a socket rigidly connected to the trailer, the socket engaging rear and upper faces of the ball, means for retaining the socket against the ball, a tension member extending below the plane of the ball and socket connection, one end of the tension member being connected to the trailer at a point remote from the ball and socket connection, a hook pivoted to the vehicle at a point below the ball, the other end of the tension member being connected to the hook, the hook being pivoted to swing in a vertical plane along the vehicle axis, resilient means carried by the vehicle for resisting swinging of the hook to the rear, and means for applying tension to the tension member.

6. A trailer hitch for connecting a vehicle and a trailer comprising a ball rigidly connected to the vehicle, a socket rigidly connected to the trailer, the socket engaging rear and upper faces of the ball, means for retaining the socket against the ball, a tension member extending below the plane of the ball and socket connection, one end of the tension member being connected to the trailer at a point remote from the ball and socket connection, a hook pivoted to the vehicle at a point below the ball, the other end of the tension member being connected to the hook, the hook being pivoted to swing in a vertical plane along the vehicle axis, resilient means carried by the vehicle for resisting swinging of the hook to the rear, and means for applying tension to the tension member, said last named means comprising a jack carried by the trailer having a foot engaging an intermediate portion of the tension member.

7. In a trailer hitch for connecting a vehicle and a trailer comprising a pivoted connection between rigid members of the vehicle and trailer, a tension member connecting the vehicle and trailer, said tension member being located below the pivotally connected rigid members, one end of said tension member being connected to a rigid portion of the trailer, resiliently yielding means carried by the vehicle, said means comprising a hook member pivoted to the vehicle in a plane below the ball and pivoted to swing in a vertical plane along the axis of the vehicle, the hook having an intermediate forwardly extended rear face and a lower face located rearwardly of the intermediate face, a yoke pivoted to the vehicle in advance of the hook to swing in the same plane as the hook, the yoke carrying a compression spring adapted to selectively press against either the intermediate or lower rearward faces of the hook, the other end of the tension member being detachably connected to the hook and means for applying tension to the tension member.

DAVID D. AREHART.

REFERENCES CITED

The following references are of record in the file of this patent:

UNITED STATES PATENTS

| Number | Name | Date |
|---|---|---|
| 2,234,163 | Gurney et al. | Mar. 11, 1941 |